(12) United States Patent
Gaud et al.

(10) Patent No.: US 12,339,667 B2
(45) Date of Patent: Jun. 24, 2025

(54) AUTONOMOUS MOBILE ROBOTS FOR COVERAGE PATH PLANNING

(71) Applicants: Rapyuta Robotics Co., Ltd., Tokyo (JP); Taisei Corporation, Tokyo (JP)

(72) Inventors: Ayush Kumar Gaud, Tokyo (JP); Shigekazu Matsuzaki, Tokyo (JP); Koji Nakatani, Tokyo (JP); Takafumi Kashimoto, Tokyo (JP)

(73) Assignees: Rapyuta Robotics Co., Ltd., Tokyo (JP); Taisei Corporation, Tokyo (JP)

( * ) Notice: Subject to any disclaimer, the term of this patent is extended or adjusted under 35 U.S.C. 154(b) by 80 days.

(21) Appl. No.: 17/583,250

(22) Filed: Jan. 25, 2022

(65) Prior Publication Data
US 2023/0147624 A1 May 11, 2023

Related U.S. Application Data

(60) Provisional application No. 63/278,169, filed on Nov. 11, 2021.

(51) Int. Cl.
*G05D 1/00* (2024.01)

(52) U.S. Cl.
CPC ......... *G05D 1/0274* (2013.01); *G05D 1/0219* (2013.01); *G05D 1/0238* (2013.01); *G05D 1/0291* (2013.01)

(58) Field of Classification Search
CPC .. G05D 1/0274; G05D 1/0219; G05D 1/0238; G05D 1/0291; G05D 1/0217; G05D 1/0246; G05D 2201/0207
(Continued)

(56) References Cited

U.S. PATENT DOCUMENTS 5,315,517 A   5/1994 Kawase et al.
11,016,491 B1 * 5/2021 Millard .................. G06N 3/045
(Continued)

FOREIGN PATENT DOCUMENTS

JP   H05158533 A   6/1993
JP   2007249632 A  9/2007
JP   2017050018 A  3/2017

OTHER PUBLICATIONS

Song Soohwan et al: "Online coverage and inspection planning for 3D modeling", Autonomous Robots, vol. 44, No. 8, Aug. 8, 2020, pp. 1431-1450, XP037264942.
(Continued)

*Primary Examiner* — Anne Marie Antonucci
*Assistant Examiner* — Jodi Jones
(74) *Attorney, Agent, or Firm* — Trupti P. Joshi

(57) ABSTRACT

The disclosure generally relates to a method and a system for heterogeneous autonomous mobile robots for coverage path planning. The method may include receiving sensor data from one or more sensor devices. The sensor data includes information corresponding to one or more robots in a predefined region. The method may further include generating a map for the one or more robots based on the received sensor data. The map includes a probable occupancy of each of the plurality of cells by the one or more robots in the predefined region. The method further includes determining a set of poses of the one or more robots based on the generated map and an optimal set of poses from the set of poses based on the visibility matrix. The method may further include generating a coverage path plan for each of the one or more robots based on the determined optimal set of poses.

21 Claims, 9 Drawing Sheets

(58) Field of Classification Search
USPC ..... 701/23, 25, 28, 26, 1, 300, 27, 469, 411,
701/523, 450, 468, 96, 120, 445, 446, 42,
701/461, 32.4, 420, 451, 454, 436, 455,
701/56
See application file for complete search history.

(56) References Cited

U.S. PATENT DOCUMENTS

| | | | |
|---|---|---|---|
| 2018/0246520 A1* | 8/2018 | Martinson | G05D 1/0094 |
| 2019/0220020 A1* | 7/2019 | Macias | G05D 1/0251 |
| 2019/0286145 A1* | 9/2019 | LaFary | G05D 1/0255 |
| 2020/0398428 A1* | 12/2020 | Murray | B25J 9/1682 |
| 2021/0103290 A1* | 4/2021 | Pajovic | G05D 1/0287 |
| 2021/0356972 A1* | 11/2021 | Kwon | G05D 1/246 |
| 2022/0163969 A1* | 5/2022 | Li | G08G 1/096811 |
| 2022/0197304 A1* | 6/2022 | Cochran | G05D 1/0297 |

OTHER PUBLICATIONS

Jing Wei et al: "Sampling-based view planning for 3D visual coverage task with Unmanned Aerial Vehicle", 2016 IEEE/RSJ International Conference on Intelligent Robots and Systems (IROS), IEEE, Oct. 9, 2016, pp. 1808-1815, XP033011638.

Zhou Boyu et al: "FUEL: Fast UAV Exploration Using Incremental Frontier Structure and Hierarchical Planning", IEEE Robotics and Automation Letters, IEEE, vol. 6, No. 2, Jan. 14, 2021, pp. 779-786, XPO11834085.

Bircher Andreas et al: "Three-dimensional coverage path planning via viewpoint resampling and tour optimization for aerial robots", Autonomous Robots, vol. 40, No. 6, Nov. 2, 2015, pp. 1059-1078, XP036021882.

Search Report and Search Opinion mailed on Dec. 23, 2022, in European Application No. 22185921.8.

Zaenker Tobias et al: "Viewpoint Planning for Fruit Size and Position Estimation", 2021 IEEE/RSJ International Conference on Intelligent Robots and Systems (IROS), IEEE, Sep. 27, 2021 (Sep. 27, 2021), pp. 3271-3277, XP034051502, DOI: 10.1109/IROS51168.2021.9636701 [retrieved on Dec. 3, 2021].

* cited by examiner

Multiple agents after exploration. Both regions are completely covered due to shared

AUTONOMOUS MOBILE ROBOTS FOR COVERAGE PATH PLANNING

CROSS-REFERENCE TO RELATED APPLICATIONS

The present application claims the benefit of priority to U.S. Provisional Application No. 63/278,169, filed on Nov. 11, 2021, the contents of which are hereby incorporated by reference herein in their entirety.

TECHNICAL FIELD

The disclosure herein generally relates to coverage path planning, more particularly to autonomous mobile robots for coverage path planning.

BACKGROUND

Complete coverage path planning requires a robot to go through every location in the workspace while also avoiding obstacles and/or future obstacles. Single-robot and multi-robot coverage path planning has been widely used, such as household cleaning robots, demining robots, lawn mowers and agricultural automatic harvesters. There are many solutions to the full traversal path planning method in static environments, and these solutions are generally applicable for known environments. However, in a real application environment, it may not be possible to know environmental information that does not change in advance. Although there are many implementations for coverage planning, there are few and less advanced solutions to multi-robot coverage planning in an unknown and dynamic environment.

SUMMARY OF THE INVENTION

The accompanying drawings, which are incorporated in and constitute a part of this disclosure, illustrate exemplary embodiments and, together with the description, serve to explain the disclosed principles.

Embodiments of the present disclosure present technological improvements as solutions to one or more technical problems recognized by the inventors in conventional systems. In one embodiment, a processor implemented method for autonomous mobile robots for coverage path planning is disclosed. The method includes receiving sensor data from one or more sensor devices, the sensor data comprising information corresponding to one or more robots in a predefined region, wherein the predefined region is divided into a plurality of cells. The method further includes generating a map for the one or more robots based on the received sensor data, the map comprising a probable occupancy of each of the plurality of cells by the one or more robots in the predefined region. The method further includes determining a set of poses of the one or more robots based on the generated map, wherein the set of poses and the plurality of cells forms a visibility matrix, the visibility matrix comprising an index for quality of sensor observation. The method further includes determining an optimal set of poses from the set of poses based on the visibility matrix, wherein determining the optimal set of poses comprises estimating an overall coverage value of each cell in the visibility matrix and generating a coverage path plan for each of the one or more robots based on the determined optimal set of poses, wherein generating the coverage path plan comprises assigning a sensor visibility cost to each of the cells corresponding to the optimal set of poses.

In another embodiment, a system for autonomous mobile robots for coverage path planning is disclosed. The system includes a memory storing instructions, and one or more hardware processors coupled to the memory via the one or more communication interfaces. The one or more hardware processors are configured by the instructions to receive sensor data from one or more sensor devices, the sensor data comprising information corresponding to one or more robots in a predefined region, wherein the predefined region is divided into a plurality of cells. The system is further configured to generate a map for the one or more robots based on the received sensor data, the map comprising a probable occupancy of each of the plurality of cells by the one or more robots in the predefined region. The system is further configured to determine a set of poses of the one or more robots based on the generated map, wherein the set of poses and the plurality of cells forms a visibility matrix, the visibility matrix comprising an index for quality of sensor observation. The system is further configured to determine an optimal set of poses from the set of poses based on the visibility matrix, wherein determining the optimal set of poses comprises estimating an overall coverage value of each cell in the visibility matrix and generate a coverage path plan for each of the one or more robots based on the determined optimal set of poses, wherein generating the coverage path plan comprises assigning a sensor visibility cost to each of the cells corresponding to the optimal set of poses.

In yet another embodiment, one or more non-transitory machine-readable information storage mediums are provided. Said one or more non-transitory machine-readable information storage mediums comprises one or more instructions which when executed by one or more hardware processors causes receiving sensor data from one or more sensor devices, the sensor data comprising information corresponding to one or more robots in a predefined region, wherein the predefined region is divided into a plurality of cells. The method further includes generating a map for the one or more robots based on the received sensor data, the map comprising a probable occupancy of each of the plurality of cells by the one or more robots in the predefined region. The method further includes determining a set of poses of the one or more robots based on the generated map, wherein the set of poses and the plurality of cells forms a visibility matrix, the visibility matrix comprising an index for quality of sensor observation. The method further includes determining an optimal set of poses from the set of poses based on the visibility matrix, wherein determining the optimal set of poses comprises estimating an overall coverage value of each cell in the visibility matrix and generating a coverage path plan for each of the one or more robots based on the determined optimal set of poses, wherein generating the coverage path plan comprises assigning a sensor visibility cost to each of the cells corresponding to the optimal set of poses.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
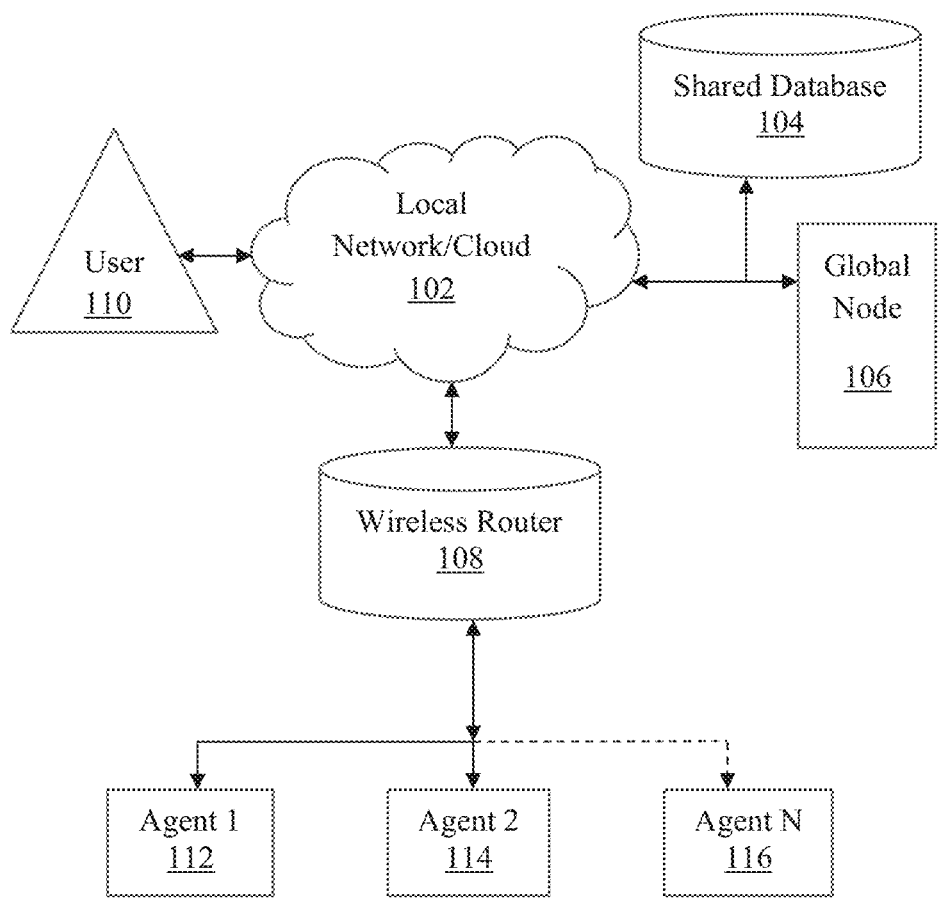
FIG. 1 illustrates a system architecture for autonomous mobile robots for coverage path planning, in accordance with some embodiments of the present disclosure.

Exemplary embodiments are described with reference to the accompanying drawings. In the figures, the leftmost digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments. It is intended that the following detailed description be considered as exemplary only, with the true scope and spirit being indicated by the claims (when included in the specification).

Embodiments of present disclosure provide techniques to heterogeneous one or more autonomous mobile robots for coverage path planning. The autonomous mobile robots searching for spaces and objects is an important application of multi-vehicle systems, where a single robot or in case of multiple robots are coordinated to explore an unknown environment or spaces or objects. This technique has wide applications like search and rescue, fault detection and monitoring, localization and mapping, etc. The present embodiments provide a method and a system which reduces the overall task completion time with integrated information shared amongst the one or more robots, reducing the amount of motion and time taken by an autonomous vehicle and energy costs and an improved sensor model compared to conventional methods. The technique is not restricted to robots but may be utilized for other autonomous vehicles that may function in applications, like identifying vacant spots for fleets of autonomous cars in parking areas, drones in field areas, factories, exploratory drones and forklifts for pick and drop etc.

Embodiments of the present method provides a method and a system to achieve the aforementioned objective by generating coverage plans for one or more agents such that a predefined region is covered and each feasible/visible cell in the predefined region is seen by the sensors such that the confidence of visibility is higher than a predefined threshold. By sharing the sensory information in the form of map or raw data, we are able to optimize the process, i.e. reduce the time or reduce the traversed distance by the robot etc.

In one embodiment, autonomous mobile robots used in autonomous payload pick operations are equipped with one or more sensor devices to detect the autonomous payloads within a specific range, the range may be user defined or predetermined based on a task. The technique of detecting sensors requires a robot to first navigate to a location such that the payloads may be detected by the robot. Embodiments of the present disclosure provides a method and a system to the technical problem of finding the locations autonomously by generating paths in the salient region such that the complete region is covered by the sensor field of view (FOV). The robot navigates through the region while also dynamically updating the covered regions and paths and accounting for obstacles in the environment. Embodiments of the present disclosure provide a sensor model which captures information outside a user defined region. The captured information may include the type of obstacles, orientation of the objects, position of the objects, location of the objects and the like. The information captured by the one or more sensor devices is stored and shared as sensor data. The sensor data captured is non-binary thereby provides information based on each captured image. Each captured image may be of different orientation and each image improves confidence of visibility of the objects. Once a threshold of the confidence of visibility is achieved, the sensor data is stored and shared amongst a plurality of agents in the given region. The sensor data continuously provides feedback on the type of image captured, the orientation and position of the image captured and the angle of the image captured thereby facilitates updating the global map and improves the overall confidence of visibility of the objects. The sensor data is an aggregated information received from multiple devices with multiple orientation and different angles, positions from which the item/object is captured. The sensor data also provides continuous feedback on the observations and thereby update the map dynamically. Unlike conventional systems, the process of receiving continuous feedback and updating the map ensures maximum quality of the measurements of each of the poses. During exploration of predefined spaces and searching for objects, a database of all the payloads keeps track of locations and type of the payload. Once the exploration is complete and the database is created, it can be used for payload pick operations and broadcast/share information for current or future explorations.

A detailed description of the above-described system and method for autonomous mobile robots coverage path planning is shown with respect to illustrations represented with reference to FIGS. 1 through 9.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 is a block diagram illustrating system architecture for autonomous mobile robots for coverage path planning, in accordance with some embodiments of the present disclosure. The system 100 includes a local network/cloud 102 connecting one or more user 110 to a global node 106. The local network/cloud 102 may be considered on-demand availability of computer system resources with/without the user's direct active management. The local network/cloud 102 includes one or more processors and memory to generate and store the coverage path plans or trajectories. In one embodiment, local network/cloud 102 may include a database for storing the coverage path plans or trajectories and related data for generating the coverage path plans, as discussed herewith. In one embodiment, the architecture of the system 100 enables sharing vital information between robots (or agents as referred herein) and with the global node. The global node plays an important role in integration of data from different sources and relaying back the integrated information to the robots. Herein, the autonomous mobile robots are referred to as agents, namely, agent 1 112, agent 2 114 . . . agent N 116. The system 100 supports heterogeneous autonomous devices like a plurality of robots for example, agent 1 112, agent 2 114. The global node 106 also enables maintaining dynamically generated global maps of a user defined region as well as integrating and sharing local maps from each agent. In another embodiment, the agents may publish sensor data and integrate at the global node 106 and only a single global map is maintained that is shared with all agents. One or more agents may share and integrate information continuously and dynamically using a shared database 104. The local map and global map generated is updated continuously and accessed by the one or more agents via the shared database 104. Wireless router 108 facilitates communication between the one or more agents and the global node 106, shared database 104, and the user 110 via the local network/cloud 102. One or more functionalities of the system 100 and components thereof, is further explained in detail with respect to FIGS. 2-8.

Figure 2:
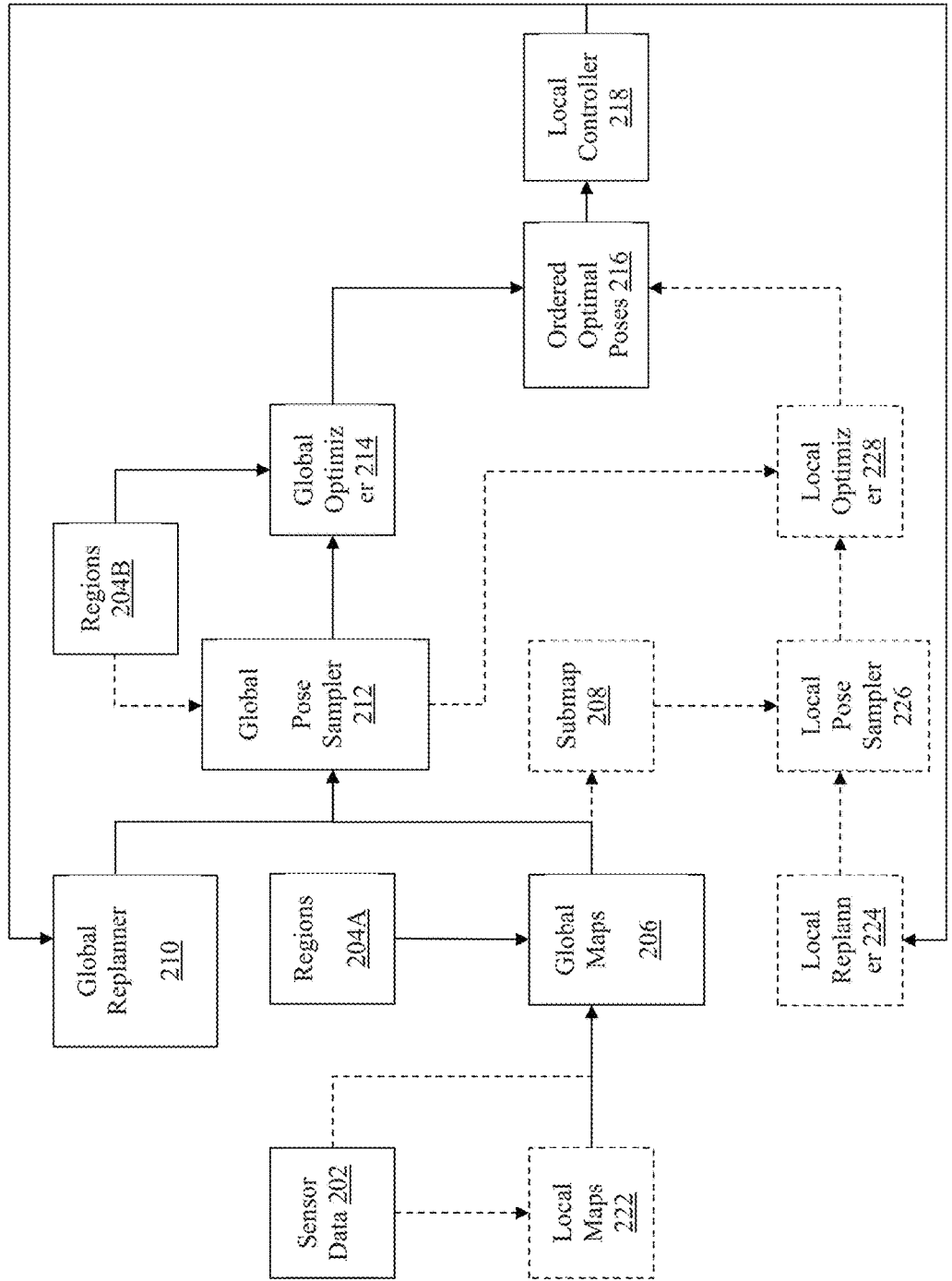
FIG. 2 illustrates a graphical representation of an agent exploration of a region, in accordance with some embodiments of the present disclosure.

FIG. 2 illustrates a flow diagram of exploration process for coverage path planning, in accordance with some embodiments of the present disclosure. The flow diagram 200 includes a sensor data 202 containing information to generate maps for one or more robots in a predefined exploration region. As shown in the FIG. 2, global maps 206 are generated using the information stored in one or more sensor devices as sensor data 202 or via local maps 224 generated by each of the individual robots. The sensor model in accordance with some embodiments of the present disclosure provides information outside the user defined region as well. In one embodiment, the one or more sensor devices may be a radar, the radar may capture information related to obstacles in the predefined region. In another embodiment, the sensor device may be a camera, the camera captures information related to the one or more robots and information related to the items/objects in the predefined region. The sensor data 202 may include information related to obstacles items/objects, orientation of the item/objects, positions of the item/objects in the predefined region. The sensor data 202 captured is non-binary. In other words, the sensor data 202 provides information based on each captured image unlike a binary output which only provides information either as seen or not seen. Each captured image may be of different orientation and each image improves the confidence of the visibility of the item/objects by integrating information related to various angles of visibility. For example, a desired threshold is set for a particular object and each captured image with a different angle is assigned a value indicating the quality of observation. The quality of observation is improved once it is above a certain defined threshold. The sensor data is continuously shared amongst a plurality of agents in the given region. Herein, every image or every observation made by the one or more sensor devices is updated and the probability of each observation is improved with different orientation and positions of the one or more agents. The sensor data 202 is an aggregated information received from multiple devices with multiple orientation and different angles from which the item/object is captured. The sensor data 202 also provides continuous feedback on the observations and thereby updates the map dynamically. The process of receiving continuous feedback and updating the map ensures maximum quality of the measurements of each of the poses.

In an embodiment, the robots are equipped with an omnidirectional sensory system that provides a description of the free space surrounding the robot and detects the boundary of an obstacle within the maximum sensing range (RS). Each robot may broadcast the information stored in its memory within a communication range (RC) at any time. The information broadcast may be arbitrary information and also includes coverage planner information, obstacle information, the robot is always open for receiving the relative position from all robots including a neighbor robot located within the communication range. The communication range is larger than the sensing range and hence the information is dynamically and continuously shared between the robots within the communication range to accelerate the region exploration task with minimum motion of the robots. For example, for a robot to plan its initial motion, a full path information may not be needed, hence to minimize the total navigation time, information related to the first few cells from the region may be produced and the full path may be updated as each robot progresses the navigation. This ensures wait time reduction for each of the robots before the initial path is provided. Further, the present method as described allows the path planner to produce a path with only a subset of the regions.

The sensor data 202 is then used for generating global maps 206 and submaps 208. The global map includes a collision map and/or coverage map of a region 204A. In one embodiment, the collision map is a discretized set of cells that covers an entire predefined region. The collision map determines the probability of each cell from amongst the plurality of cells being occupied. The collision map determines feasibility of an agent physically being in a cell and computes visibility of cells by accounting for occlusions. The collision map may also be shared amongst the plurality of agents to increase observable environment and utilize such information from the one or more sensor devices on the plurality of agents. Further, any new observations from the one or more sensor devices are added to the collision map by updating the probability of cells based on the sensor model using Bayes rule. In one embodiment, the coverage map is generated as a part of the global map 206. The coverage map includes observations made by the one or more sensor devices on coverage of a region spatially and therefore provides representation of how much a region is covered by the one or more robots. The coverage map is also represented using discretized cells and each of the discretized cells determines the quality of observations for each cell. The coverage map may also be shared amongst the multiple robots and the quality estimates are updated using observations from the one or more sensor devices on the one or more robots. In one embodiment, there may also be a sub map 208 for each of the robots from the multiple robots.

Embodiments of the present disclosure provides global pose sampler 212. The global pose sampler 212 calculates a feasible set of poses of the one or more robots using collision map and robots' geometry that is spatial region a robot occupies. In one embodiment, each robot from the multiple robots may have a local pose sampler 226 or may share a common pose sampler that runs on a global node, for example, global pose sampler 212. The local pose sampler 226 generates feasible poses within a designated region of a robot while a global sampler 212 generates poses for overall combined regions, for example, regions 204B. Since the multiple robots may be heterogeneous and may have different geometric representations, in one example, feasibility may be computed using conservative geometry such that a common set of feasible poses can be shared across the robots. In another example, feasibility may be computed using region bound robot geometries. In this example, the region assigned to each of the robots is assumed and therefore geometries of each of the robots may be associated to the assigned regions. In this example, feasible poses are computed based on spatial location of each cell. Embodiments of the present disclosure also provide representation of each pose generated by the global pose sampler 212.

In one embodiment, to cover feasible regions completely by sensor observations, each pose generated by the pose sampler needs to be represented to know the effects of the coverage. The present method provides a visible representation to achieve the aforementioned objective by assigning an index to each cell in the coverage map. Thereafter, a matrix with rows representing cell indices and columns representing poses is formed. Each element in this matrix represents an estimate of quality of observation that would be made from a specific pose for the plurality of cells. The quality estimate is based on the sensor model. For example, if the sensor device is a camera, then cells in the field of view of the camera will have non zero quality. In case one or more robots is searching for objects, then position of the object in the image, size of object in the image etc. may be used to estimate the overall quality of that observation. The visibility matrix enables to determine an optimal set of poses from the generated feasible set of poses. While calculating the feasibility of each pose it is advantageous to run on the global pose sampler 212 such that observation from multiple sensors and multiple agents may be taken into account to provide a better result. Once, the generated poses are represented using the visibility matrix, the poses are optimized further to achieve overall coverage value.

In one embodiment, a global optimizer 214 performs a two-step optimization on the poses, that is the visibility matrix. In the first step, the global optimizer 214 calculates an optimal set of poses and in the second step, the global optimizer calculates an optimal order in which the poses are visited. Thereafter, using the visibility matrix, an overall coverage value of each cell above a certain threshold is determined. The overall coverage value may be formulated as a linear program to obtain a set of cells with minimum elements. Further pruning operations may be performed to eliminate extraneous poses. Once an optimal set of poses are generated, the global optimizer 214 computes an order in which these poses are visited. In an embodiment, the order of the poses may be formulated as a Travelling salesman problem using metrics that need to be optimized, like distance, for example, Euclidean distance in free space. In another embodiment, the global optimizer 214 may use estimated distance from a global planner that accounts for the kinematic constraints as well as feasibility of a robot. The method of calculating optimized sets via estimated distance enables to prioritize poses based on a distance that a robot may need to travel instead of just prioritizing poses that are close to the robot. For example, for an autonomous car, moving back 2 m might consume less time and effort compared to moving sideways by 1 m. Embodiments of the present disclosure provide both global optimizer 214 and local optimizer 228. The local optimizer 228 operates in a similar way as the global optimizer 214, although it operates specific to an agent. In an example embodiment, while using a local pose sampler 226, both steps of aforementioned optimization may be performed locally. While, when using a global pose sampler 212, in the first step of computing the optimal set of poses may be performed by the global node (as described in FIG. 1). Once the optimal set of poses is generated, the set may be either distributed to agents based on designated regions to perform the second step locally at local optimizer 228 or may be performed globally for each agent at the global optimizer 214. Based on the priority the poses optimized at the global optimizer 214 are shared with the agents. The aforementioned methods may depend on the application and/or infrastructure used to share information.

Embodiments of the present disclosure provides a local controller 218 for segregating and aggregating information between the global node and the plurality of agents. The local controller 218 enables sharing information from a plurality of agents and aggregates at the global node. The local controller 218 also facilitates integration of data from different sources and relaying back information to the plurality of agents. For example, local maps from each agent from the plurality of agents may be shared and integrated together with the global map and maintained by the global node. In another example, the one or more robots may publish the sensor data 202 which may be integrated at the global node and only a single global map is maintained that is relayed to the plurality of agents. In one embodiment, if a global pose sampler 212 is used for generating feasible candidate poses, then the global pose sampler 212 uses information from global maps 206. Once the candidate poses are generated, they are divided based on designated region locations and assigned to respective agents. In another embodiment, a local optimizer 228 may be used by each of the agents from amongst the plurality of agents. In another embodiment, if optimization is performed by the global node, all poses may be combined together instead of running an optimizer for each agent. This helps in generating a globally optimal set of poses that are segregated for every region. These poses can either be relayed to agents directly or after the second step of optimization for calculating the priority order of the poses. The local controller 218 also triggers replanning of the coverage path planning in certain scenarios. Embodiments of the present disclosure provides a global replanner 210 for the global replanner trigger 220 or local replanner 224 for the local replanner trigger 230 in such certain scenarios.

In one embodiment, the environment in which exploration is performed may be dynamic and the one or more agents are continuously capturing new information of the environment from the one or more sensor devices. In certain scenarios there may be cases in which the plan being executed by an agent may become infeasible. When the current plan becomes infeasible due to one or more factors then the local controller 218 triggers a local replanner 224 or the global replanner 210. Embodiments of the present disclosure provide one or more approaches if the plan becomes infeasible. In one embodiment, when the current plan becomes infeasible, the agent may select the next feasible pose from the priority list and continue until the final goal is achieved. This approach reduces the number of replanning computations required. In another embodiment, replanner may be triggered after arriving at a local goal or after a certain progress is made in the visibility to improve the quality of solutions. The present system computes visibility at the candidate poses, however while going from one pose to another, the coverage map is simultaneously getting updated too and hence the cells that are uncovered are always less than or equal to the ones used during optimization.

Figure 3:
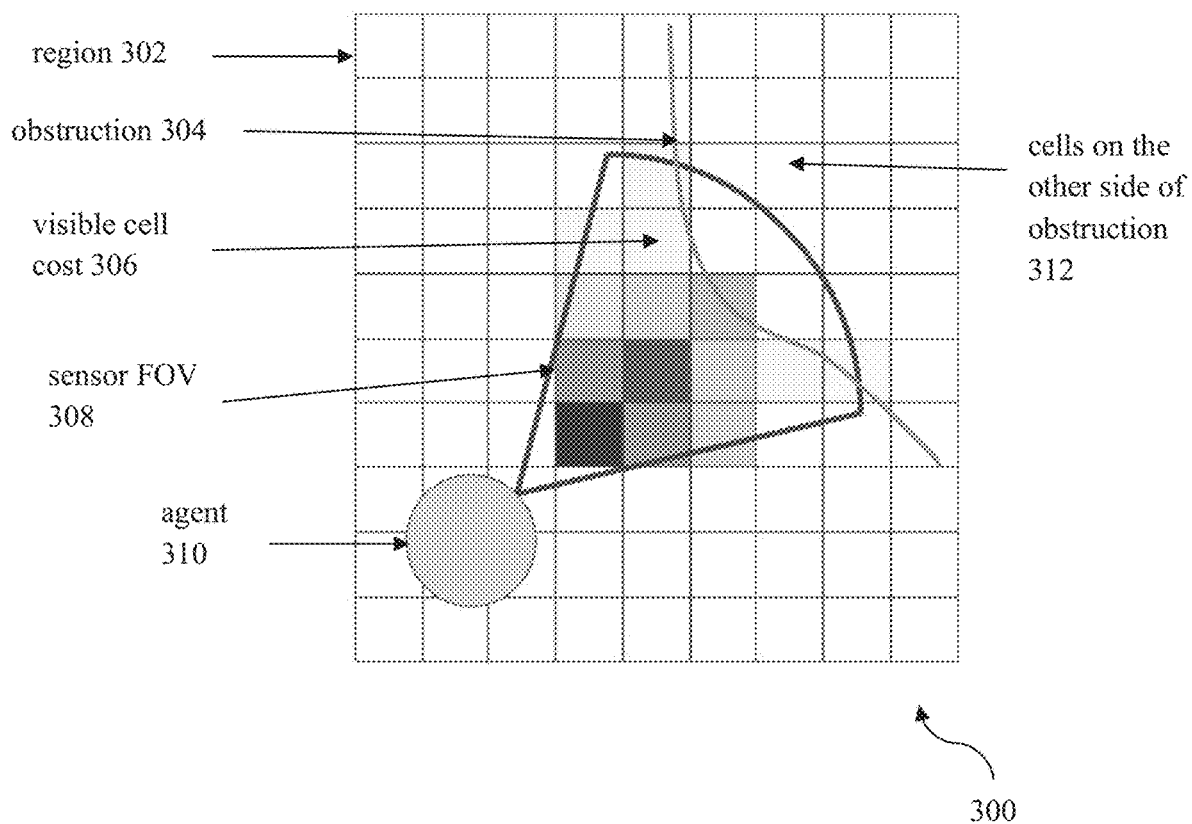
FIG. 3 illustrates a graphical representation of multiple agents exploring two regions simultaneously, in accordance with some embodiments of the present disclosure.

FIG. 3 illustrates a graphical representation of an agent exploration of a region, in accordance with some embodiments of the present disclosure. As shown in 300 of FIG. 3, a user-defined region 302 is considered for exploration for a single robot, herein agent 310. The region 302 is divided into visible cell 306 and the cells on the other side of the obstruction 312. The obstruction 304 is depicted by a line separating the two regions, namely, the visible region and other regions as occluded regions. The area covered by the sensor 308 is depicted by a cone and the visibility of each cell in the region 302 is based on a cost assigned to each cell. For example, cost assigned to the darkest cell in the sensor field of view (FOV) 308 indicates highest confidence. Herein, a value or cost may be assigned to each of the cells as a measure of confidence. The cell with highest value/cost indicates that the visibility of the cell is high for the agent 310. In an example embodiment, the shade of each cell determines a predetermined confidence threshold. Based on the confidence threshold the visibility of each cell in the region 302 is determined. For example, the regions covered (that is seen or visible) by the agent 310 is within the obstruction 304. The covered region by the agent 310 is used for coverage planning based on the cost assigned. Each of the regions viewed by the sensor is assigned a value and a threshold which determines the confidence of observance of each of the regions.

Figure 4:
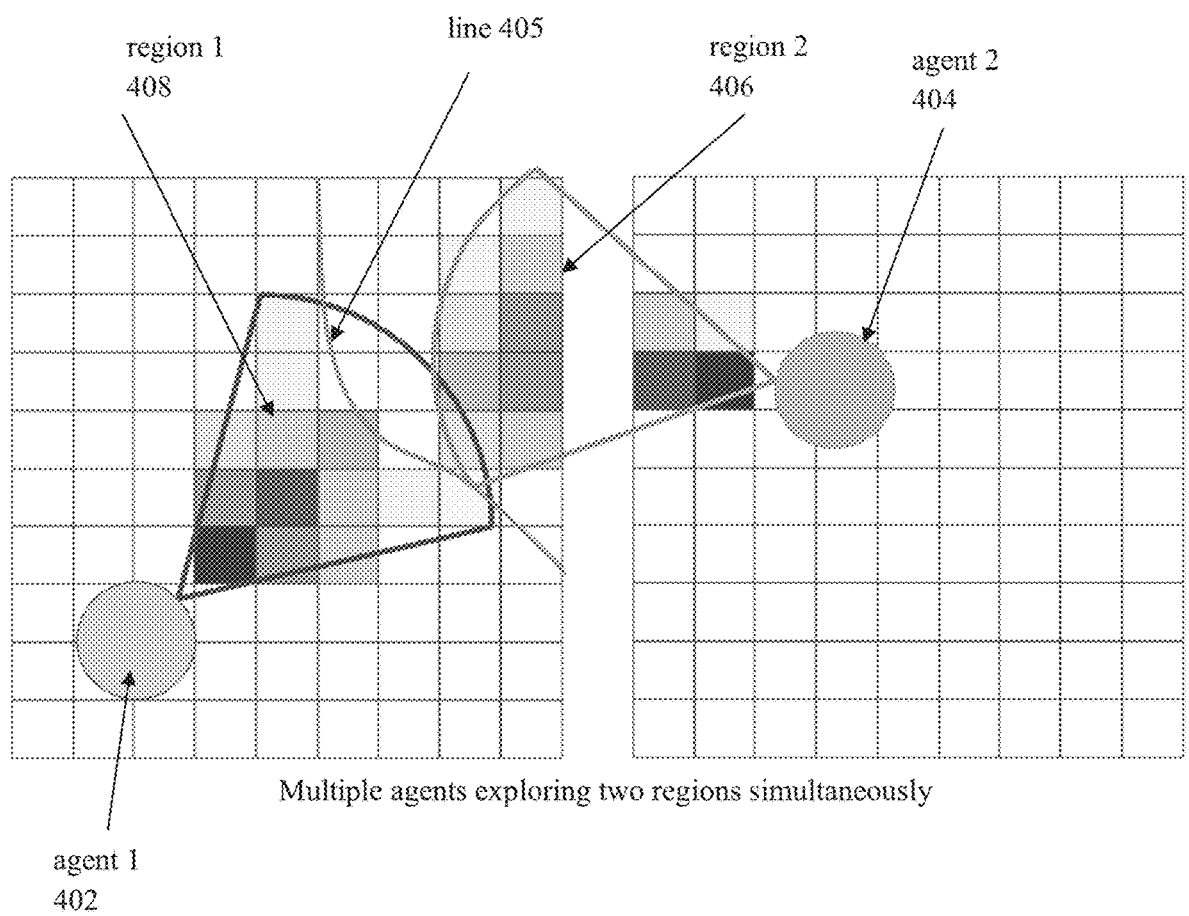
FIG. 4 illustrates a graphical representation of multiple agents after exploration of a region, in accordance with some embodiments of the present disclosure.

FIG. 4 illustrates a graphical representation of multiple agents exploring two regions simultaneously, in accordance with some embodiments of the present disclosure. As shown in FIG. 4, two agents, namely, agent 1 402 explores a region of view, region 1 408 and agent 2 404 explores a region of view, region 2 406. The agent 1 402 covers a region within the line 405 (obstruction). Each cell in the region of visibility depicts a confidence of visibility. In other words, darker cells in the region of visibility are nearer to the agent, the lighter cells are farther from the agent and white cells are the one with no visibility (that is the cells beyond the line 405 or other side of the obstruction). Similarly, agent 2 404 is also represented by the confidence of visibility as shown in FIG. 4. Herein, the two agents are exploring a defined region simultaneously and broadcasting the information dynamically based on the regions explored as each robot progresses a defined navigation path. For example, agent 2 404 is broadcasting the information related to region 2, which is not visible to agent 1, thereby updating the progress of each of the robot's exploration, within the communication and sensor range. The broadcast information may be shared and used by other agents for current or future exploration. The present method reduces time taken to cover a region, reduces the amount of motion by a robot, and reduces situations of missing a region or not detecting a region since each of the agents is dynamically using information or feedback from the sensors.

In an example, the agents may be a single autonomous vehicle or multiple heterogeneous autonomous vehicles. In another example, the agents may be using one or more types of sensor devices/sensor views for covering more regions in less time. Embodiments of the present disclosure provides a system and method of sharing obstacle information as well as sharing specific information related to the area of visibility to achieve the aforementioned technical solutions.

Figure 5:
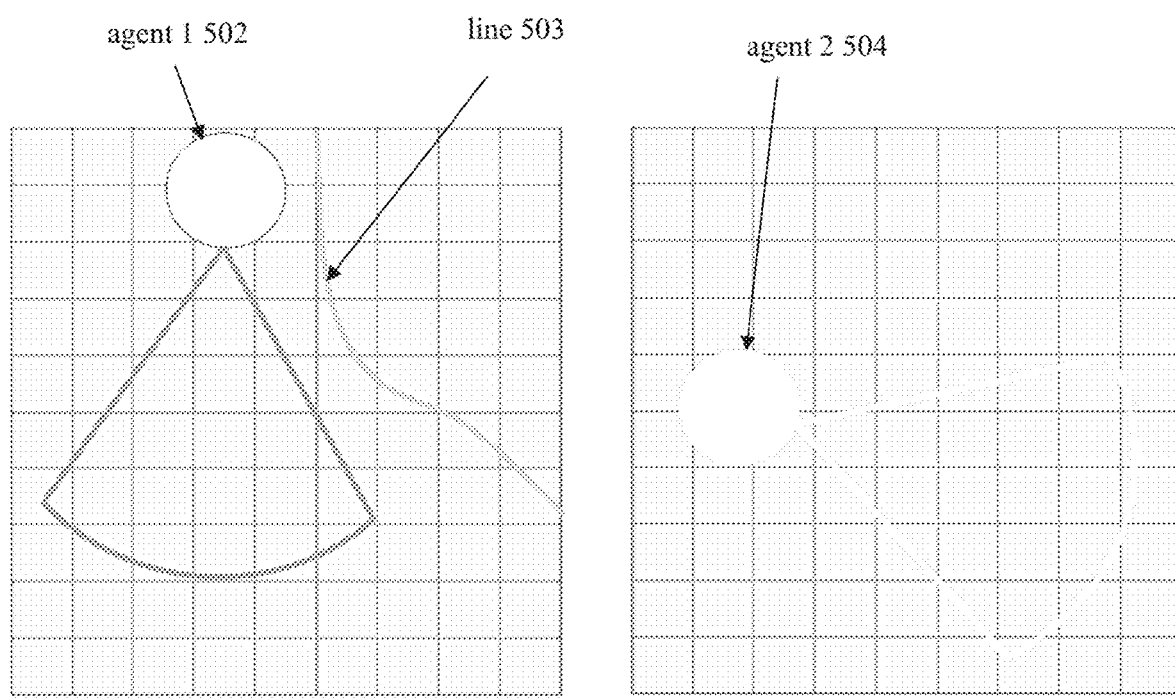
FIG. 5 illustrates a graphical representation of multiple agents after exploration of a region, in accordance with some embodiments of the present disclosure.

FIG. 5 illustrates a graphical representation of multiple agents after exploration of a region, in accordance with some embodiments of the present disclosure. As mentioned above, the shared information between the agent, for example agent 1 502 and agent 2 504 covers the complete area of the user defined region. As shown in FIG. 4, the region beyond the line 503 of agent 1 502 is covered (no white cells) due to specific information shared between the agent 1 502 and agent 2 504. Even though the area beyond the line 503 or beyond obstruction is not visible, the shared information accelerates the process of exploration and increases the accuracy of the visibility based on the confidence threshold.

Figure 6:
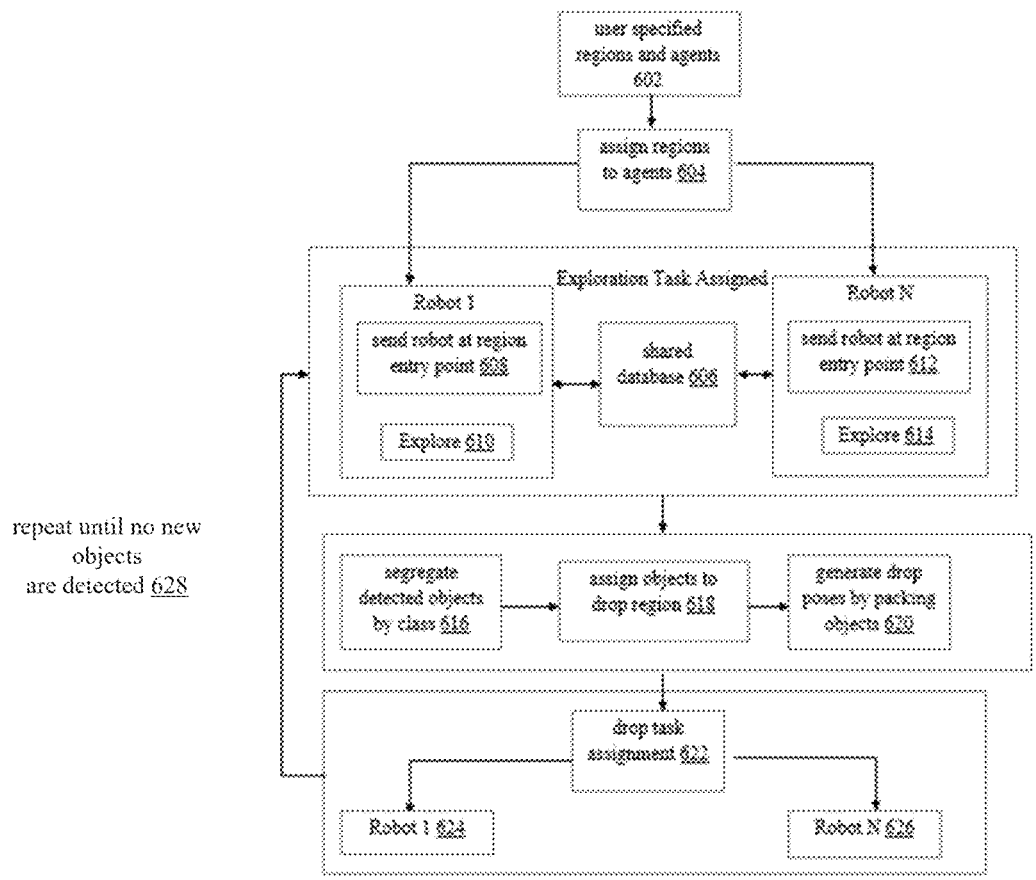
FIG. 6 illustrates a flow diagram for a random pick-up use case, in accordance with some embodiments of the present disclosure.

FIG. 6 illustrates a flow diagram for a random pick-up use case, in accordance with some embodiments of the present disclosure. The flow diagram 600 of FIG. 6 illustrates a test case of search and pick-up items from a user specified region using one or more agents and dropping them into designated drop locations. In one embodiment, at 602, a region of exploration and agents may be defined by a user (e.g. warehouse associate). In another embodiment, the region of exploration may be predetermined and automatically updated based on a task assigned to a robot. The exploration may be for a single robot or multiple robots. At 604, the user defined regions for exploration are assigned to each of the agents from the one or more agents. The exploration task may be for a single robot or multiple heterogeneous robots. As shown in FIG. 6, the exploration task is assigned to robot 1 at 608 to explore a region 610 and to robot N at 612 to explore a region 614. The robot 1 and robot N are positioned at the entry point of the user defined regions 602. Further, the multiple robots, in this case robot 1 and robot N share a database 606, for communication and broadcasting information between each other. The sensor data, in accordance with one or more embodiments of the present disclosure as described above is used for generating information related to the objects/items to be picked up and dropped at a designated location. The information may include different orientation and positions of the objects, kind of objects, location of the object, poses generated using the local and global maps etc. In one embodiment, the robots are equipped with an omnidirectional sensory system that provides a description of the free space surrounding the robot and detects the boundary of an obstacle within the maximum sensing range (RS). Each robot may broadcast the information stored in its memory within a communication range (RC) at any time. The information broadcasted may be arbitrary information and also includes coverage planner information, obstacle information. The robot is always open for receiving relative position from other robots including a neighbor robot located within the communication range, for example robot N may be in the communication range of robot 1. The communication range is larger than the sensing range and hence the information is dynamically and continuously shared between the robots within the communication range to accelerate the region exploration task with minimum motion of the robots.

In one embodiment, the generated poses of the objects are optimized as described in FIG. 2, the objects to be dropped are segregated. For example, the objects to be dropped in the defined region may include different types, for example, wooden pallets, plastic pallets, metal items etc. At 616, the detected objects are segregated by class based on the information stored in the shared database 606, for example information like sensor data. The segregated objects by class at 616 are assigned a drop location at 618 and picked up to drop at the designated location. The different types of poses are marked and are arranged based on the type of poses by generating drop poses by packaging objects at 620. For example, herein packaging means finding optimal geometric configurations of the multiple objects to be arranged/dropped in a designated region, such that the designated region is used efficiently. In one embodiment, the arranged drop poses are used to perform drop task assignment at 622 by robot 1 at 624 and robot N at 626. The drop assignment is completed once all the objects assigned a destination location are picked and dropped at the designated location. The aforementioned process is repeated until no new objects are detected in the defined region 628. The repeat cycle also ensures that no object is missed due to occlusion or obstructions.

Figure 7:
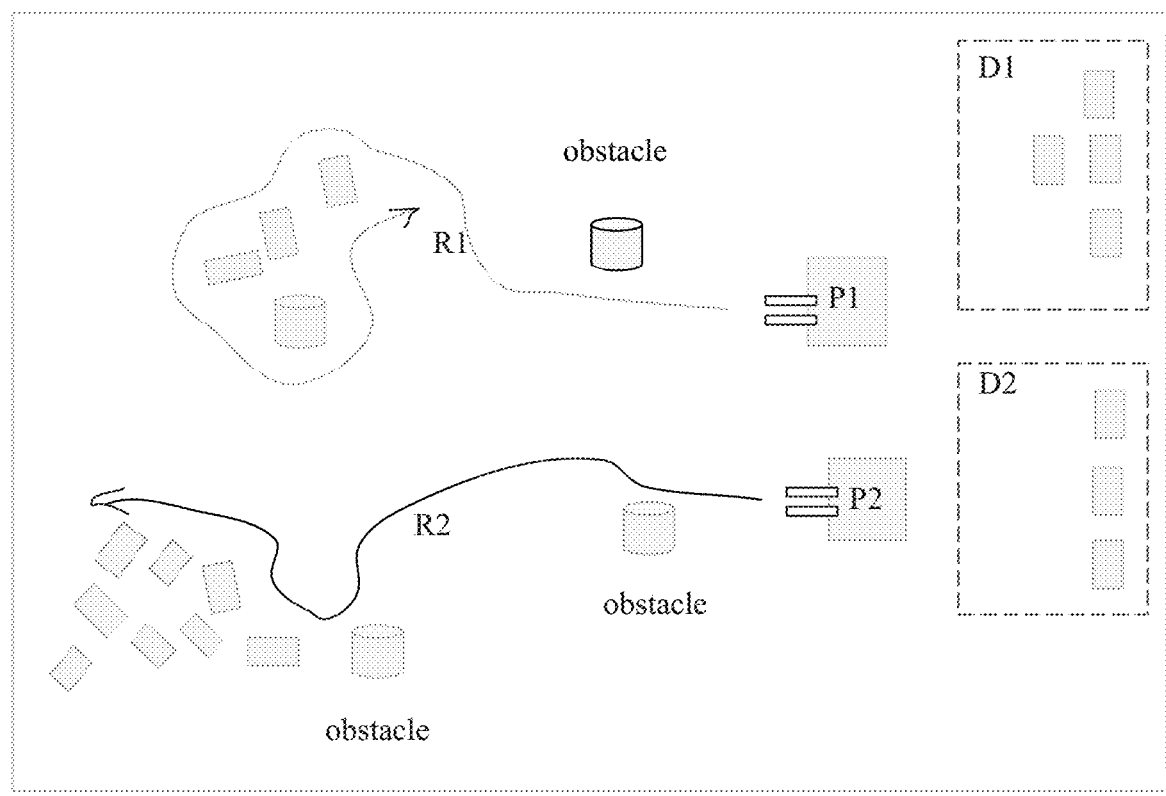
FIG. 7 illustrates a pictorial representation of a random pick-up use case of FIG. 6, in accordance with some embodiments of the present disclosure.

FIG. 7 illustrates a pictorial representation of a random pick-up use case of FIG. 6, in accordance with some embodiments of the present disclosure. As shown in the FIG. 7, the two agents in the defined region are P1 and P2 which are assigned a region for pick-up and drop locations. The agent P1 is assigned a pick-up region R1 and drop location D1. Similarly, agent P2 is assigned a pick-up region R2 and a drop location D2. Based on the set of feasible pose samples and optimization of these pose samples, agents P1 and P2 navigate within the defined region and pick the items for the region R1 and R2 respectively. The obstacles are captured at the global node or at the local node such that pick-up and drop of the items in the region is performed without collision.

Figure 8:
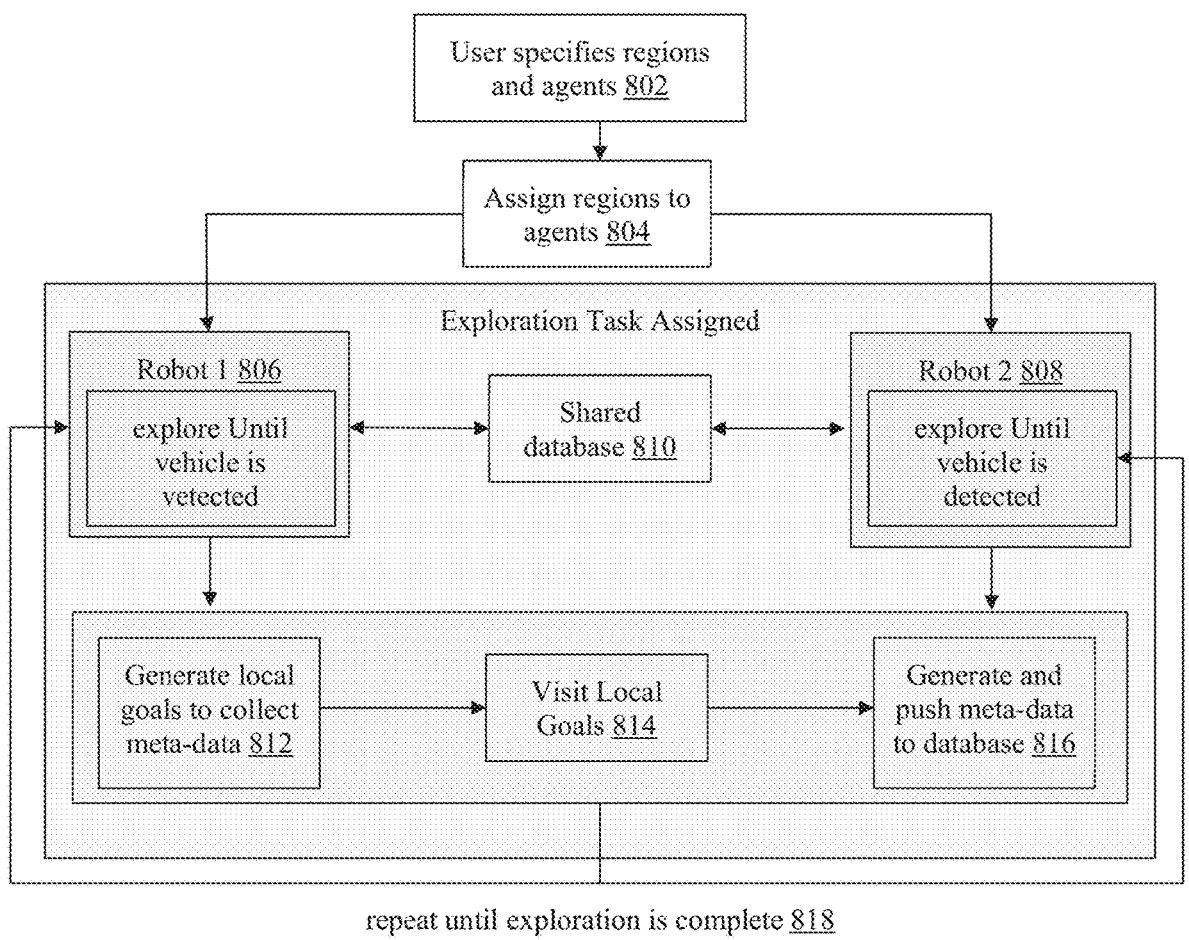
FIG. 8 illustrates a flow diagram for unstructured parking lot surveillance use case, in accordance with some embodiments of the present disclosure.

FIG. 8 illustrates a flow diagram for unstructured parking lot surveillance use case, in accordance with some embodiments of the present disclosure. The flow diagram 800 of FIG. 8 illustrates Search for occupied and unoccupied locations in an unstructured parking lot using one or more agents. If a vehicle is detected then generate local goals to identify the license plate information or other relevant meta-data of the vehicle and maintain a database. In one embodiment, at 802, a region of exploration and agents is defined by a user. In another embodiment, the region of exploration may be predetermined and automatically updated based on a task assigned to a robot. The exploration may be for a single robot or multiple robots. At 804, the user defined regions for exploration are assigned to each of the agents from the one or more agents. The exploration task may be for a single robot or multiple robots. As shown in FIG. 8, the exploration task is assigned to robot 1 at 806 to explore a region until a vehicle is detected and to robot N at 612 to explore a region until a vehicle is detected. The robot 1 and robot N are positioned at the entry point of the user defined regions 802. Further, the multiple robots, in this case robot 1 and robot N share a database 810, for communication and broadcasting information between each other. The shared information may include type of vehicle, parking location, information related to license plate etc. The vehicle may be detected from any arbitrary location. Once the vehicle is detected, local goals are generated such that relevant meta-data may be collected. That local goal may be a pose from which the license plate may be detected or a series of goals if the meta-data is 3D reconstruction of the vehicle etc. Since the sensory information is shared, multiple agents may be used to perform the 3D reconstruction. The process of exploration in the present use case is repeated until the vehicle is detected. Once the vehicle is detected with the license plate information, then the exploration process is completed. Herein, the local goal may include generating a set of poses such that the license plate is visible. Furthermore, information related to the detected vehicle is collected as meta-data at 812. Based on the collected meta-data and local goal, the local goal is reached at 814 and thereafter published and stored in the database 816 for all the robots to access and generate an improved local goal.

Figure 9:
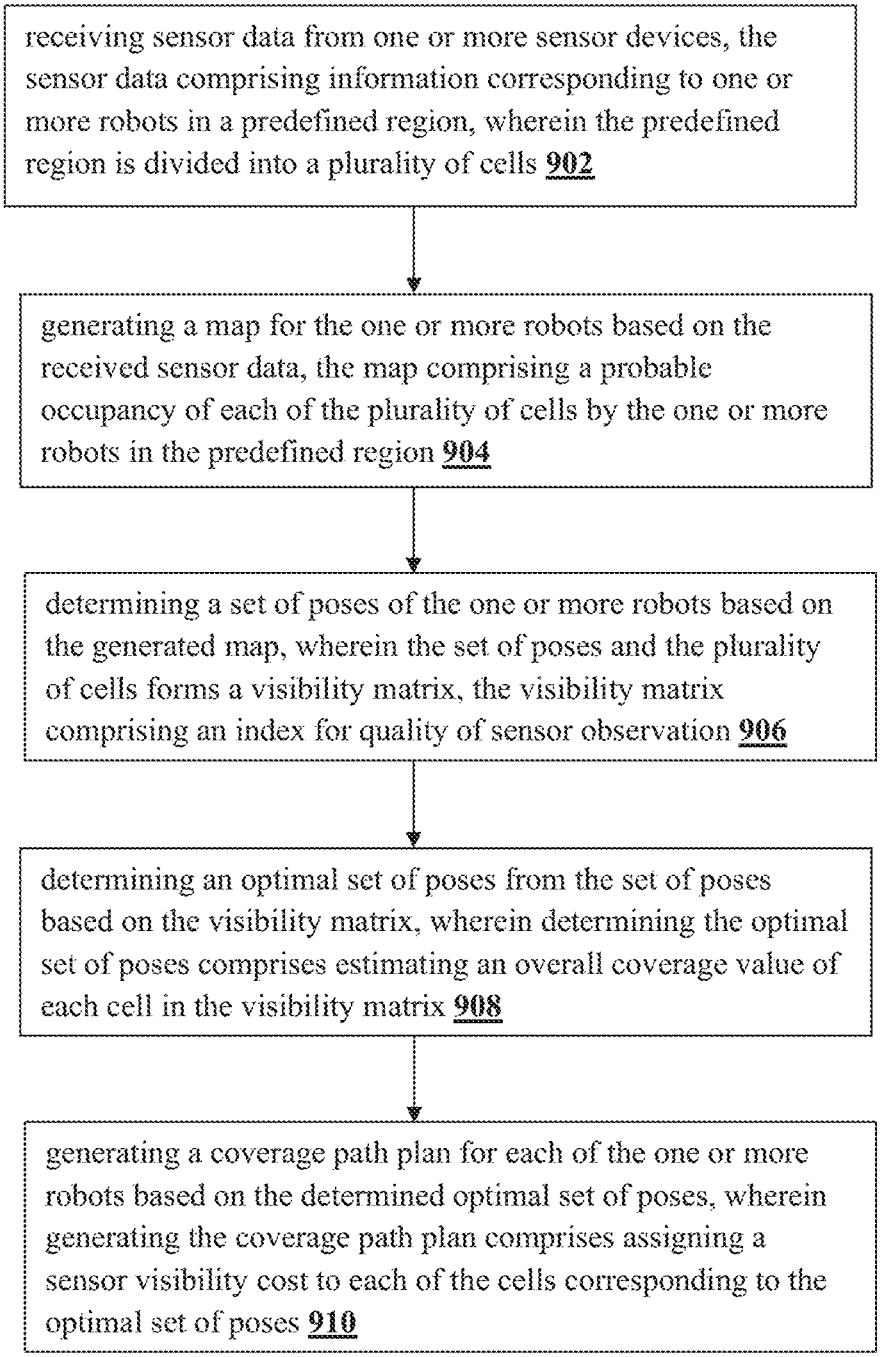
FIG. 9 illustrates a flow-diagram of a method 900 for autonomous mobile robots for coverage path planning, in accordance with some embodiments of present disclosure.

FIG. 9 illustrates a flow-diagram of a method 900 for autonomous mobile robots for coverage path planning, in accordance with some embodiments of present disclosure. The method 900 may be described in the general context of computer executable instructions. Generally, computer executable instructions can include routines, programs, objects, components, data structures, procedures, modules, functions, etc., that perform particular functions or implement particular abstract data types. The method 900 may also be practiced in a distributed computing environment where functions are performed by remote processing devices that are linked through a communication network. The order in which the method 900 is described is not intended to be construed as a limitation, and any number of the described method blocks can be combined in any order to implement the method 900, or an alternative method. Furthermore, the method 900 can be implemented in any suitable hardware, software, firmware, or combination thereof. In an embodiment, the method 900 depicted in the flow chart may be executed by a system, for example, the system 100 of FIG. 1. The method 900 of FIG. 9 is described with reference to FIGS. 1-5.

Referring to FIG. 9, in the illustrated embodiment, the method 900 is initiated at 902 where the method includes receiving sensor data from one or more sensor devices. The sensor data includes information corresponding to one or more robots in a predefined region. The predefined region is divided into a plurality of cells. In one embodiment, the predefined region may be user defined or application dependent. The information corresponding to one or more robots may include sensor field of view of the one or more robots in the predefined region including the plurality of cells. For example, the sensor field of view includes position of the one or more robots, orientation and positions of the one or more robots, one or more viewpoints of the one or more robots in the predefined region etc. As shown in FIG. 3, the field of view corresponds to an agent (or robot) and the one or more cells within that field of view determines the quality of measurement/observation by the one or more sensor devices. The sensor model, in accordance with the present embodiment is non-binary. Therefore, the method updates the coverage path based on feedback received from the sensor data. The feedback may include the quality of each observation captured by the one or more sensor devices. For example, the quality of first observation of a viewpoint of a robot may be 20, and the quality of second observation may be 40 which is at a different angle than the first observation, the combination of the first and second observation integrated, increases the overall confidence of the observations made by the one or more sensor devices. Likewise subsequent observation may increase the value of quality of observation above a certain defined threshold. Herein, a log odd model may be applied to update the probability of every observation made by the sensor device and thereby increase the overall quality of observation. The sensor data may be aggregated by multiple robots and multiple sensor devices over a period of time. Also, the sensor data is dynamically updated as and when new observations are made. The sensor data helps in generating a map corresponding to one or more robots.

At 904, the method includes generating a map for the one or more robots based on the received sensor data. The map includes a probable occupancy of each of the plurality of cells by the one or more robots in the predefined region. The generated map represents the probability of each cell being occupied, that is a discretized set of cells covering the entire predefined region. The generated map also represents feasibility of a robot physically being in a cell and computes visibility of cells by accounting for occlusions. The map may also be shared between different agents to increase the observable environment and utilize information from sensors on the one or more robots. Further, any new observations from the one or more sensor devices are added to the generated map by updating the probability of cells based on the sensor model using the Bayes rule. Embodiments of the present method also generate a coverage map. The coverage map includes observations made by the one or more sensor devices covering a predefined region. In other words, the map represents how much a region is covered by a sensor device. The map is also represented in a similar fashion as collision map, using discretized cells that determine the quality of observations for each cell. The coverage map may be shared among multiple agents and the quality estimates are updated by using observations from sensors on multiple agents. The collision map enables a pose sampler to generate a feasible set of poses of the one or more robots.

At 906, the method includes determining a set of poses of the one or more robots based on the generated map. The set of poses and the plurality of cells forms a visibility matrix. The visibility matrix is created by assigning an index for quality of sensor observation to each cell in a coverage map. The visibility matrix includes rows representing the plurality of cells and columns representing the set of poses. As described in FIG. 2, the pose sampler calculates a feasible set of poses using collision map and robot's geometry, that is the spatial region that a robot occupies. For example, each agent may have its own local pose sampler or can share a common pose sampler that is running on a global node. The local pose sampler only generates feasible poses within the designated region of the robot while a global sampler generates poses over all regions combined. Since the robots may be heterogeneous and may have different geometric representations, feasibility of poses is calculated using most conservative geometry such that a common set of feasible poses can be shared across robots. In another example, region bound robot geometries may be used. This enables computing the feasible poses based on spatial location of each cell from the plurality of cells.

In one embodiment, to cover feasible regions completely by sensor observations, each pose generated by the pose sampler needs to be represented to know the effects of the coverage. The present method provides a visible representation to achieve the aforementioned objective by assigning an index to each cell in the coverage map. Thereafter, a matrix with rows representing cell indices and columns representing poses is formed. Each element in this matrix represents an estimate of quality of observation that would be made from a specific pose for the plurality of cells. The quality estimate is based on the sensor model. For example, if the sensor device is a camera, then cells in the field of view of the camera will have non zero quality. In case one or more robots is searching for objects, then position of the object in the image, size of object in the image etc. may be used to estimate the overall quality of that observation. The visibility matrix enables to determine an optimal set of poses from the generated feasible set of poses.

At 908, the method includes determining an optimal set of poses from the set of poses based on the visibility matrix. The optimal set of poses includes estimating an overall coverage value of each cell in the visibility matrix. In one embodiment, the optimization is performed in two steps, first, by calculating the optimal set of poses and second by computing the optimal order in which they are visited. For example, using the visibility matrix, an optimization solution with an objective to achieve overall coverage value of each cell above a certain threshold is formulated. The objective may be formulated as a linear program such that a set of cells with minimum elements is achieved. Further pruning operations may also be performed to eliminate extraneous poses. Once an optimal set of poses are generated, an order in which these poses are visited is computed. The order of the optimal set of poses is calculated using either Euclidean distance in free space or estimated distance from a global planner that accounts for the kinematic constraints of the robot along with the feasibility. This can enable us to prioritize poses based on the distance that the robot will actually need to travel instead of just prioritizing poses that are close. The optimal set of poses are used to generate a coverage path plan for each of the one or more robots.

At 910, the method includes generating a coverage path plan for each of the one or more robots based on the determined optimal set of poses. The coverage path plan includes assigning a sensor visibility cost to each of the cells corresponding to the optimal set of poses. These poses can either be shared with the robots directly or after the second step of optimization for calculating the priority order of the poses. The coverage path is represented as a set of cells with each cell representing sensor visibility cost as log odds. The visibility cost of the coverage region is updated based on the abovementioned sensor model iteratively (as described in FIG. 2). This helps to generate goal poses such that high quality observations may be made with the sensor. The optimized set of poses minimizes viewpoint cost such that all cells have visibility cost higher than a desired threshold. Also, predefined regions to be covered may include obstructions that may occlude the sensor field of view or restrict navigation hence the optimization is done iteratively. For multiple robots coverage region cost maps are shared between the robots and a global optimization function is run jointly for all regions combined to generate an optimal set of viewpoints in case of centralized planning. These viewpoints are distributed between the robots based on the navigation region designated to each robot. Each robot then generates its own plan to visit all viewpoints in an optimal fashion.

Embodiments of the present disclosure provides a coverage planning technique which focuses on minimizing the path length/time taken to cover a region and the quality of observations made by a sensor while accounting for the sensor measurement model. The quality of observance becomes critically important when searching for objects and estimation of object states for further manipulation. For example, coverage region by a robot or an agent is represented as a set of cells with each cell representing sensor visibility cost as log odds, as shown in FIG. 2-4. The sensor visibility cost of each viewpoint is a function of normal to edges/surfaces within the field of view. Conventionally, frontiers i.e., poses covering the boundaries of unexplored regions are used. In present embodiments, uncertainty/quality of state estimation by the sensor is modeled either actively or apriori. Also, visibility cost of coverage region is updated iteratively based on the abovementioned sensor model. This helps to generate goal poses such that high quality observations may be made with the sensor. The optimization objective of the present method is to minimize the viewpoint cost such that all cells have visibility cost higher than a desired threshold. The region to be covered can contain obstructions that may occlude the sensor field of view or restrict navigation hence the optimization is performed iteratively.

Embodiments of the present methods also provides a method of replanning the current coverage plan. The method includes initiating a replanning for the generated coverage path. The replanning includes selecting a next pose from the set of poses and generating a new coverage path for each of the one or more robots based on the next pose from the set of poses. For example, in certain scenarios there may be cases in which the plan being executed by an agent may become infeasible. When the current plan becomes infeasible due to one or more factors then the local controller triggers a local replanner or the global replanner. Embodiments of the present disclosure provide one or more approaches if the plan becomes infeasible. In one embodiment, when the current plan becomes infeasible, the agent may select the next feasible pose from the priority list and continue until the final goal is achieved. This approach reduces the number of replanning computations required. In another embodiment, replanner may be triggered after arriving at a local goal or after a certain progress is made in the visibility to improve the quality of solutions or based on feedback received from the system or user.

Embodiments of the present disclosure also provide one or more technical solutions for the conventionally known problems in the art. For example, the present method splits the problem of capturing information of the objects into two parts, generating an optimal set of viewpoints and path planning through viewpoints. The set of viewpoints are computed globally and then distributed in a centralized scenario. In case of decentralized planning, only coverage region cost map is shared while planning is done locally within each agent. In addition, optimization functions are run jointly for all regions combined to generate an optimal set of viewpoints in case of centralized planning. The viewpoints are distributed between the robots based on the navigation region designated to each robot. Each robot then generates its own plan to visit all viewpoints in an optimal fashion. In case of decentralized planning, some suboptimality is introduced due to the asynchronous nature of planning. Further, sharing coverage region cost maps enables to cover regions that are only accessible by sensors of other agents without entering the region themselves. The sensor data continuously provides feedback on the type of image captured, the orientation and position of the image captured and the angle of the image captured thereby facilitating updating the global map and improves the overall confidence of visibility of the objects. Herein, every image or every observation made by the one or more sensor devices is updated and the probability of each observation is improved with different orientation. The sensor data is an aggregated information received from multiple devices with multiple orientation and positions, different angles from which the item/object is captured. The sensor data 202 also provides continuous feedback on the observations and thereby updates the map dynamically. The process of receiving continuous feedback and updating the map ensures maximum quality of the measurements of each of the poses.

According to some embodiments, actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of protocol(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid-state Random-Access Memory (RAM) or Read Only Memory (ROM) storage units and then stored in a compressed, non-compiled and/or encrypted format. In some embodiments, hard-wired circuitry may be used in place of, or in combination with, program code for implementation of processes according to some embodiments. Embodiments are therefore not limited to any specific combination of hardware and software.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

It is intended that the disclosure and examples be considered as exemplary only, those in the art will recognize other embodiments may be practiced with modifications and alterations to that described above.

The invention claimed is:

1. A processor-implemented method comprising:
receiving, by a processor, sensor data from sensor devices, the sensor data comprising information corresponding to robots in a predefined region, wherein the predefined region is divided into a plurality of cells, wherein the robots are configured to explore the predefined region simultaneously, and broadcast the information dynamically among the robots, based on regions explored as each robot progresses a predefined path;
generating, by the processor, a collision map for the robots based on the received sensor data, the collision map comprising probability of each cell being occupied by each of the robots and visibility of each cell from the plurality of cells accounting for obstruction, wherein the collision map determines feasibility of each robot physically being in a cell among the plurality of cells and wherein the collision map is shared amongst the robots to increase an observable environment for the robots;
identifying, by the processor, a set of goal poses of the robots based on the generated collision map, wherein the set of goal poses and the plurality of cells forms a visibility matrix, the visibility matrix comprising an index for quality of sensor observation;
identifying, by the processor:
an optimal set of goal poses from the set of goal poses based on the visibility matrix, estimating an overall coverage value of each cell in the visibility matrix, and
an optimal order of goal poses visited by the robots from the determined optimal set of goal poses;
generating, by the processor, a coverage path plan for each of the robots based on the identified optimal set of goal poses and the optimal order of poses, wherein generating the coverage path plan comprises assigning a sensor visibility cost to each of the cells corresponding to the optimal set of goal poses;
initiating, by the processor, a replanning for the generated coverage path, wherein the replanning comprises selecting a next goal pose from the set of goal poses;
generating, by the processor, a new coverage path for each of the robots based on said next goal pose; and
facilitating, by the processor, traversal of the robots based on the generated new coverage path to reduce traversed distance by the robots.

2. The method of claim 1, comprising:
updating coverage path based on feedback received from the sensor data, the feedback comprising the quality of each observation captured by the sensor devices.

3. The method of claim 2, further comprising: updating probability of quality of each observation captured by the sensor devices.

4. The method of claim 2, wherein updating the coverage path further comprising:
aggregating the sensor data of each of the robots collected over a period; and
dynamically updating the sensor data upon receiving new information corresponding to the robots.

5. The method of claim 1, wherein the information corresponding to robots comprises sensor field of view of the robots in the predefined region including the plurality of cells.

6. The method of claim 5, wherein the sensor field of view comprises position of the robots, orientation of the robots, one or more viewpoint of the robots in the predefined region.

7. The method of claim 1, comprising:
generating a coverage map, the coverage map comprising a region, from the predefined region, covered by the sensor devices.

8. The method of claim 1, wherein the visibility matrix comprises assigning an index for quality of sensor observation to each cell in a coverage map, wherein the visibility matrix comprises rows representing the plurality of cell and columns representing the set of goal poses.

9. The method of claim 1, wherein identifying the optimal order of goal poses comprises creating a distance metrics for each pose from the optimal set of goal poses accounting for kinematic constraints and feasibility of each of the robots, and wherein identifying the optimal order of goal poses enables prioritizing poses to be visited by the robots.

10. The method of claim 1, wherein the sensor visibility cost assigned to each of the cells is indicative of a measure of confidence of the visibility of the cell by each of the robots.

11. A system comprising:
a memory storing instructions;
a processor coupled to the memory, wherein the processor is configured by the instructions to:
receive sensor data from sensor devices, the sensor data comprising information corresponding to robots in a predefined region, wherein the predefined region is divided into a plurality of cells, wherein the robots are configured to explore the predefined region simultaneously, and broadcast the information dynamically among the robots, based on regions explored as each robot progresses a predefined path;
generate a collision map for the robots based on the received sensor data, the collision map comprising probability of each cell being occupied by each of the robots and visibility of each cell from the plurality of cells accounting for obstruction, wherein the collision map determines feasibility of each robot physically being in a cell among the plurality of cells and wherein the collision map is shared amongst the robots to increase an observable environment for the robots;
identify a set of goal poses of the robots based on the generated collision map, wherein the set of goal poses and the plurality of cells forms a visibility matrix, the visibility matrix comprising an index for quality of sensor observation;
identify:
an optimal set of goal poses from the set of goal poses based on the visibility matrix estimating an overall coverage value of each cell in the visibility matrix, and
an optimal order of poses visited by the robots from the determined optimal set of goal poses;
generate a coverage path plan for each of the robots based on the identified optimal set of goal poses and the optimal order of poses, wherein generating the coverage path plan comprises assigning a sensor visibility cost to each of the cells corresponding to the optimal set of goal poses;

initiate a replanning for the generated coverage path, wherein the replanning comprises selecting a next goal pose from the set of goal poses;

generate a new coverage path for each of the robots based on said next goal pose; and facilitate traversal of the robots based on the generated new coverage path to reduce traversed distance by the robots.

12. The system of claim 11, further configured to:

updating coverage path based on feedback received from the sensor data, the feedback comprising the quality of each observation captured by the sensor devices.

13. The system of claim 12, further configured to update probability of quality of each observation captured by the sensor devices.

14. The system of claim 12, further configured to:

aggregate the sensor data of each of the robots collected over a period; and dynamically update the sensor data upon receiving new information corresponding to the robots.

15. The system of claim 11, wherein the information corresponding to robots comprises sensor field of view of the robots in the predefined region including the plurality of cells.

16. The system of claim 15, wherein the sensor field of view comprises position of the robots, orientation of the robots, one or more viewpoint of the robots in the predefined region.

17. The system of claim 11, further configured to:

generate a coverage map, the coverage map comprising a region, from the predefined region, covered by the sensor devices.

18. The system of claim 11, wherein the visibility matrix comprises:

assigning an index for quality of sensor observation to each cell in a coverage map, wherein the visibility matrix comprises rows representing the plurality of cell and columns representing the set of goal poses.

19. The system of claim 11, wherein to identify the optimal order of goal poses, the processor is further configured to:

create a distance metrics for each pose from the optimal set of goal poses accounting for kinematic constraints and feasibility of each of the robots, and wherein identifying the optimal order of goal poses enables prioritizing poses in which the poses are to be visited by the robots.

20. The system of claim 11, wherein the sensor visibility cost assigned to each of the cells is indicative of a measure of confidence of the visibility of the cell by each of the robots.

21. One or more non-transitory machine-readable information storage mediums comprising one or more instructions which when executed by one or more hardware processors cause:

receiving sensor data from sensor devices, the sensor data comprising information corresponding to robots in a predefined region, wherein the predefined region is divided into a plurality of cells, wherein the robots are configured to explore the predefined region simultaneously, and broadcast the information dynamically among the robots, based on regions explored as each robot progresses a predefined path;

generating a collision map for the robots based on the received sensor data, the collision map comprising probability of each cell being occupied by each of the robots and visibility of each cell from the plurality of cells accounting for obstruction, wherein the collision map determines feasibility of each robot physically being in a cell among the plurality of cells and wherein the collision map is shared amongst the robots to increase an observable environment for the robots;

identifying a set of goal poses of the robots based on the generated map, wherein the set of goal poses and the plurality of cells forms a visibility matrix, the visibility matrix comprising an index for quality of sensor observation;

identifying:
an optimal set of goal poses from the set of goal poses based on the visibility matrix, estimating an overall coverage value of each cell in the visibility matrix, and an optimal order of poses visited by the robots from the determined optimal set of goal poses;

generating a coverage path plan for each of the robots based on the identified optimal set of goal poses and the optimal order of poses, wherein generating the coverage path plan comprises assigning a sensor visibility cost to each of the cells corresponding to the optimal set of goal poses;

initiating a replanning for the generated coverage path, wherein the replanning comprises selecting a next goal pose from the set of goal poses;

generating a new coverage path for each of the robots based on said next goal pose; and facilitating, by the processor, traversal of the robots based on the generated new coverage path to reduce traversed distance by the robots.

* * * * *